June 18, 1946.  S. C. HURLEY, JR  2,402,405
PHOTOELECTRIC INSPECTION DEVICE
Filed Sept. 23, 1944  3 Sheets-Sheet 1
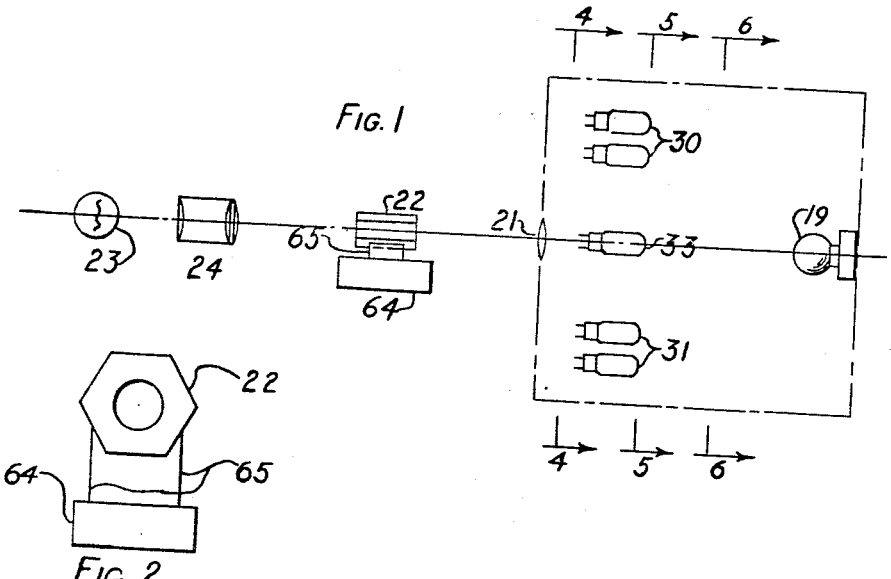
Fig. 1
Fig. 2
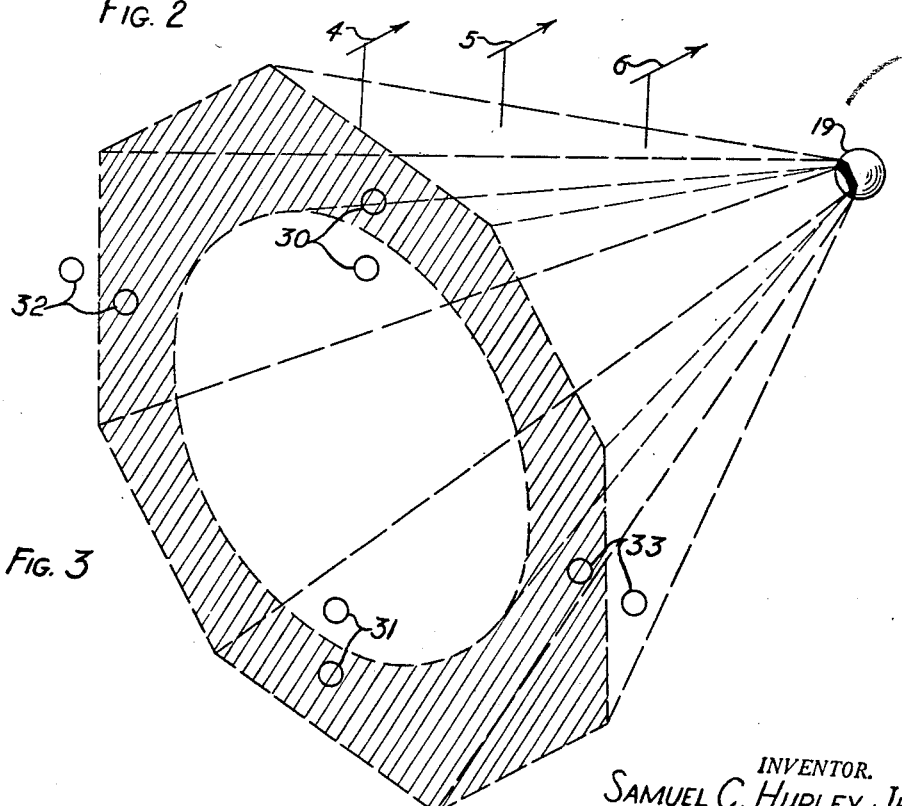
Fig. 3
INVENTOR.
SAMUEL C. HURLEY JR.
BY Benedict & Swartwood
ATTORNEYS June 18, 1946.  S. C. HURLEY, JR  2,402,405
PHOTOELECTRIC INSPECTION DEVICE
Filed Sept. 23, 1944  3 Sheets-Sheet 2

SYMETRICAL AXIS

INVENTOR.
SAMUEL C. HURLEY JR.
BY Benedict & Swartwood
ATTORNEYS

June 18, 1946.  S. C. HURLEY, JR  2,402,405
PHOTOELECTRIC INSPECTION DEVICE
Filed Sept. 23, 1944  3 Sheets-Sheet 3
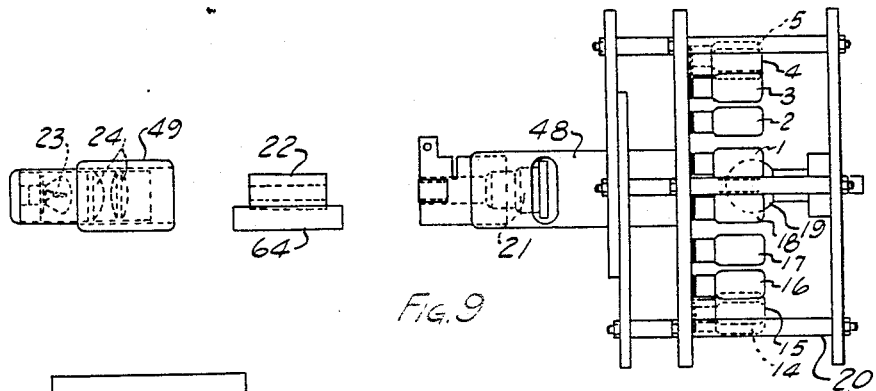
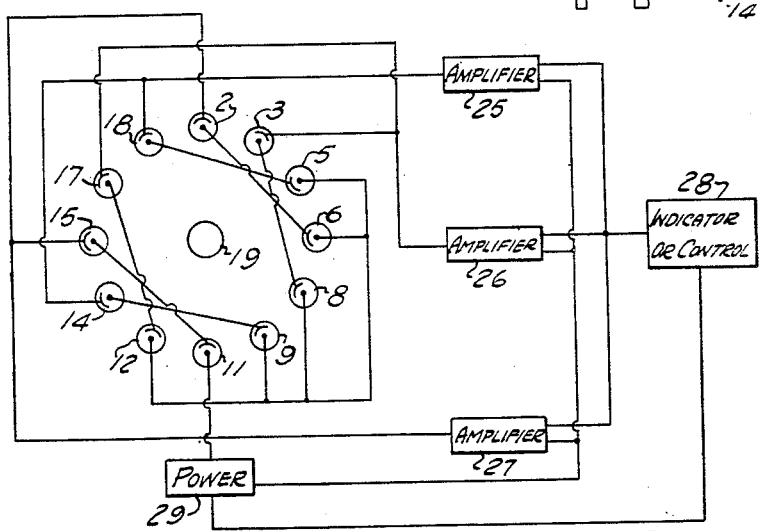
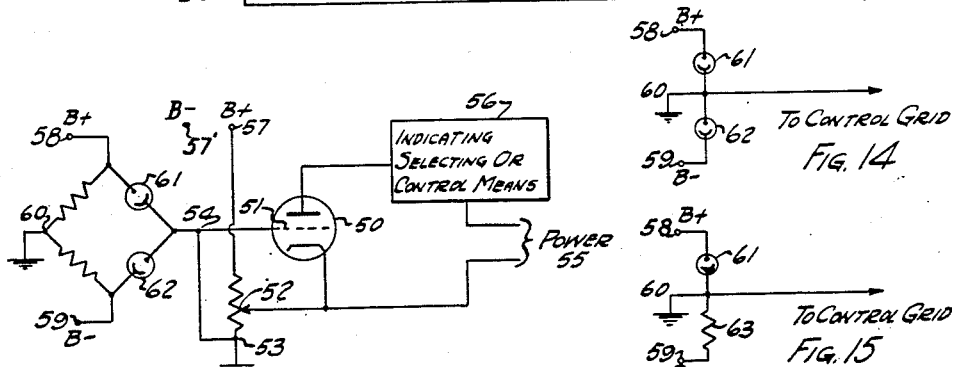
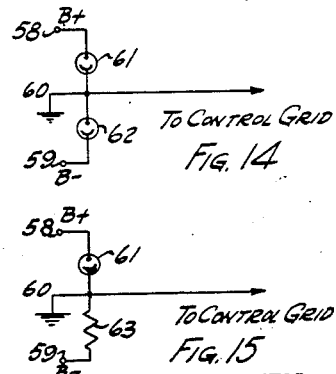
INVENTOR.
SAMUEL C. HURLEY JR.
BY Benedict & Swartwood
ATTORNEYS Patented June 18, 1946

2,402,405

UNITED STATES PATENT OFFICE 2,402,405

PHOTOELECTRIC INSPECTION DEVICE

Samuel C. Hurley, Jr., Danville, Ill.

Application September 23, 1944, Serial No. 555,471

2 Claims. (Cl. 88—14)

This invention relates to an apparatus for scanning both external and internal surfaces and perimeters of objects positioned in a photoelectric inspection zone. It is particularly directed to measuring, determining, or inspecting external and internal dimensions and surfaces of symmetrical objects, for example, to inspect a tube or cylinder for concentricity and eccentricity and to measure or indicate the external and internal diameters.

Among the objects of my invention are to provide a novel apparatus for:

1. Checking the outline or scanning the outside and internal surfaces of articles.
2. For measuring and indicating outside and inside diameters of tubes, cylinders, hollow truncated cones, hollow truncated cylinders, uniform holes through spheres, and the like.
3. For checking annular objects for eccentricity and concentricity.
4. For inspecting cross-sectional shapes of articles.
5. For determining and indicating shapes such as screws, threads, bevels, angles, curvatures, roundness, and irregularities in the surface of the object.

It is a further object of my invention to provide a novel optical system including a magnifying mirror capable of magnification in at least two planes and I preferably employ a sphere or a segment of a sphere for accomplishing inspections of the type disclosed herein, although other mirrors such as those having elliptical surfaces or parabolic surfaces may also be used. The mirrors may either be convex or concave.

It is a further object of my invention to interpret or determine the results of the inspection operation by determining the state of illumination of light sensitive devices properly spaced about the axis of the image or light beam reflected from the magnifying mirror. The light sensitive devices may be located around the axis of the outline of the shadow of the object or around the light beam reflected from the magnifying mirror. In order to scan the object undergoing inspection, the light sensitive devices are further positioned such that they correspond to a predetermined position of a portion of the light beam passing through the inspection zone and being reflected from the magnifying mirror.

It is a further object of my invention to provide suitable means for determining the light response in the light sensitive devices.

It is a further object of the invention to orient the object in the inspection zone in order that a beam of light passed over the object and through the inspection zone will in each inspection cast an image of the portion of the article undergoing inspection through the inspection zone at a predetermined point.

One embodiment of my invention comprises a light source and means for projecting a beam of light through an inspection zone and means for orienting the object undergoing inspection in the inspection zone. A magnifying mirror capable of magnification in at least two planes is arranged to receive the light passing through the inspection zone. Light sensitive devices are such as photoelectric tubes or photocells and the like are arranged around or about either the symmetrical axis of the image of the article or the longitudinal axis of the light beam. Means are provided for determining the state of illumination of the light sensitive devices in order to interpret the results of the inspection.

Additional advantages, objects, applications and uses of my apparatus will become apparent by referring to the drawings in which Figure 1 illustrates diagrammatically a type of optical system, plus one method of orientation of the object in the inspection zone.

Figure 2 shows an end view of the support with knife edges orienting the object undergoing inspection so that its image will always be reflected in the same manner.

Figure 3 shows in perspective the shadow of the image reflected from the spherical mirror in Figure 1.

Figure 4:
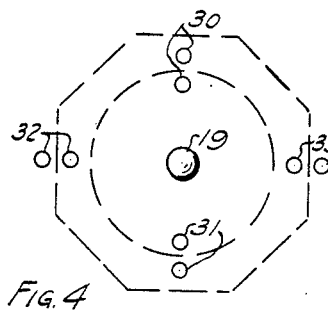
Figure 5:
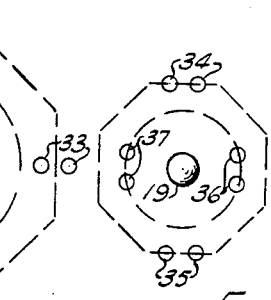
Figure 6:
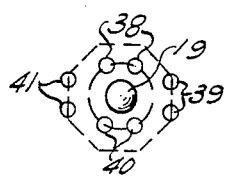

Figures 4, 5, and 6 show an arrangement of phototubes around the axis of the light beam reflected from the mirror in three different planes transverse to said axis for making different inspections.

Figure 7:
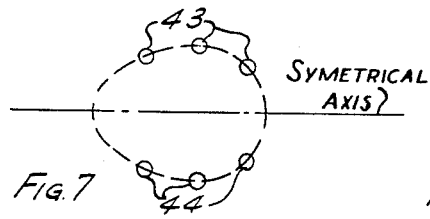

Figure 7 illustrates the arrangement of phototubes about the symmetrical axis of the symmetrical outline of an object.

Figure 8:
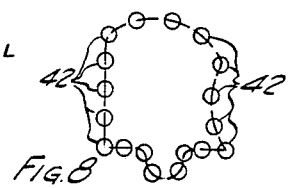

Figure 8 shows one method of arranging phototubes to scan the outline or perimeter of an irregular object.

Figure 9 shows in detail a specific apparatus illustrating the principle of my invention for measuring the internal diameter and eccentricity and concentricity of a tube or cylinder.

Figure 10:
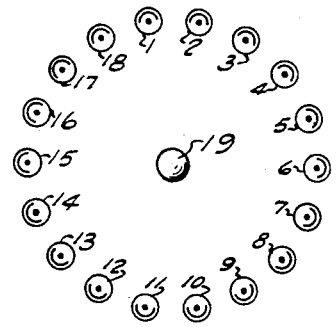

Figure 10 shows an arrangement of a plurality of phototubes about the axis of the reflected light beam as shown in Figure 9.

Figure 11:
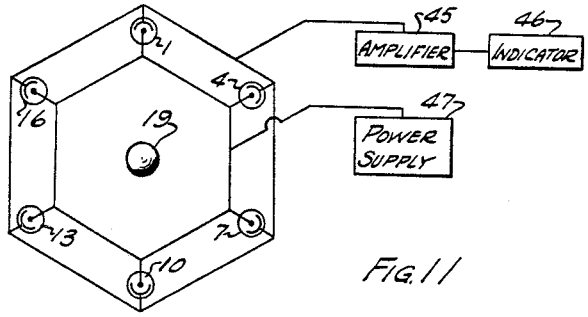

Figure 11 shows the wiring circuit for the phototubes used in Figure 10 for determining the internal diameter.

Figure 12 illustrates a wiring diagram for the tubes shown in Figure 10 for determining the eccentricity and concentricity of the tube or cylinder.

Figures 13, 14, and 15 illustrate specific methods for controlling the indicating or selecting or control means for the interpretation of the results of the inspection.

Referring to Figure 1, the source of light 23 is shown as an incandescent light although any other suitable source of light may be used. The condensing lenses 24 and a projecting lens 21 are arranged on a common optical axis. In this case, the article 22 to be inspected is hexagonal on its exterior surface with a round opening of uniform cross-section through its longitudinal dimension. A support 64 for orienting the annular object 22 in proper test position is shown in Figure 1, but is best illustrated by the cross-sectional view in Figure 2 in which two knife edges 65 are rigidly and perpendicularly attached to the support 64 for holding the annular object 22 in a predetermined position and the use of knife edges causes as little interference as possible with the light beam passing through the inspection zone.

Referring again to Figure 1, a magnifying mirror 19 which is capable of magnification in more than one plane is shown spherical in shape, although other shapes for accomplishing the same purpose may be used as described previously. The arrangement of the phototubes in the optical setup is not completely illustrated in Figure 1 since it may be best illustrated in Figures 3 and 4. In Figures 1 and 4, one arrangement of the phototubes is shown for determining the shape of the interior and exterior surfaces. In Figure 1, it is not possible to show all the phototubes but all are shown diagrammatically in Figures 3 and 4.

Referring to Figure 4, phototubes 30 to 33 illustrate diagrammatically a way of determining the diameter and the concentricity of the annular object. Although only eight tubes are shown, additional tubes are preferably employed in order to determine an accurate inspection; but eight are sufficient to illustrate the objects of my invention.

Referring to Figure 4, tubes 30 and 31 are arranged so that the shadow falls in between each pair of the phototubes and by connecting the tubes in a suitable light sensitive circuit such as a bridge circuit, the state of illumination of the phototubes can be determined which will indicate the shape of annular objects and will also indicate the internal diameter. Tubes 32 and 33 likewise may be used to indicate the external dimension and shape of the object.

The tubes shown in Figures 1, 3 and 4 form one arrangement but other arrangements may be used as illustrated diagrammatically in Figures 5 and 6.

Referring to Figure 5, the tubes 34 and 35 are arranged to indicate or measure the external dimension or shape of the article the tubes being on the perimeter of the image and the results interpreted by measuring the amount of light received by the tubes 34 and 35. By connecting opposing pairs of tubes in parallel in a suitable circuit such as a bridge circuit, the state of illumination of the tubes can be determined. The particular method for connecting the light sensitive devices in the light sensitive circuit may be any conventional form and only a few of the circuits are illustrated herein since the arrangement of the light sensitive devices and the light sensitive circuits is not material to my invention. It is not necessary to have the tubes for indicating the outline or the shape or interior or exterior of an article in a common plane transverse to and centered on the axis of the reflected light beam or image. For example, tubes 36 and 37 in Figure 5 and tubes 38 and 40 of Figure 6 which are located in different transverse planes may be wired in the same circuit and by the use of proper resistors in those tubes nearest to the magnifying mirror, compensation for the different distances from the magnifying mirror can be made. This is particularly desirable where it is difficult to arrange all of the tubes in one common transverse plane. Similarly, tubes 39 and 41 of Figure 6 and tubes 34 and 35 of Figure 5 can be used in one common light circuit providing suitable resistors are provided.

Figure 7 shows an arrangement of tubes 43 and 44 around the symmetric axis of the symmetric figure and around the perimeter of the image in order to indicate or measure its shape or any dimension.

Figure 8 illustrates an arrangement of phototubes 42 around the perimeter of the image in order to measure or indicate the shape. Here again, opposing light sensitive units may be connected in a common light sensitive circuit such as a bridge and the state of illumination determined by the balancing or unbalancing of the bridge due to the opposing tubes receiving different degrees of illumination providing those tubes nearest the magnifying mirror 19 of Figure 3 are connected in series with suitable resistors to compensate for those tubes receiving light of greater intensity.

Figure 9 illustrates somewhat in detail a specific method and apparatus for photoelectrically inspecting an annular object such as a tube or cylinder. The light source 23 and condensing lenses 24 are embodied in case 49. The tube 22 is oriented in the inspection zone by means of the V block 64. The projecting lens 21 is located inside of casing 48 whereby it projects the light on the spherical magnifying mirror 19. A plurality of phototubes, 1 to 18, are located around the axis of the reflected beam in casing 20, and the image of the article 22 is reflected from the magnifying mirror onto the light sensitive devices which are spaced equal distances from each other and equal distances from the magnifying mirror 19 and in a common plane transverse to the axis of the light beam and centered on said axis. Therefore, if the piece is good or meets the predetermined requisites, all of the tubes 1 to 18 receive the same amount of light. The phototubes 1 to 18 are shown diagrammatically arranged in the transverse plane in Figure 10.

Referring to Figures 9 and 10, it may be desired to measure the internal diameter of the round or cylinder and determine whether the inside diameter is concentric throughout its length. I have therefore only used six of the phototubes shown in Figure 10 and arranged them as illustrated in the wiring diagram in Figure 11. The phototubes 1, 4, 7, 10, 13, and 16 are equi-distant from each other about the perimeter of the image and in a plane transverse to and centered on the axis of the reflected light beam and are connected in parallel between a power supply 47 and an amplifier 45. The intensity of the light falling on the tubes is measured by the indicator 46 connected to the amplifier 45. This will give an accurate measurement of the inside diameter regardless of whether the object is concentric, since, if the object is off center, some of the tubes will receive more light and others less light; but if the diameter is of proper size, all six of the tubes taken together receive the same amount of light and the result is the same as if the object were concentric, since the indicating means is controlled by the total light from the phototubes 1, 4, 7, 10, 13, and 16.

Figure 12 shows diagrammatically the arrangement of a wiring diagram of the remaining twelve tubes shown in Figure 10 for indicating or measuring the concentricity and eccentricity of the annular object. In this case, opposing pairs of phototubes are connected in a bridge circuit—one pair connected to the power source 29, and the other pair connected to one of the amplifiers 25, 26, and 27. If all the tubes receive the same amount of light, the object is concentric and is a good piece and no current will flow across the bridge and none of the amplifiers 25, 26, and 27 nor the indicator or control means 28 will be actuated. If any one of the opposing pairs receives more or less light than the opposing pair to which it is connected in the bridge circuit, the bridge will be unbalanced and current will flow through one of the amplifiers 25, 26, and 27, and indicator 28 will be actuated showing that the piece is eccentric and must be rejected.

Figure 13 illustrates one method of employing a bridge circuit wherein for a good piece, one of the tubes must be in shadow and the other tube in light. In this case, phototubes 61 and 62 are connected in a bridge circuit across the source of D. C. potential having its positive terminal at 58 and its negative terminal at 59 and grounded at 60. The bridge circuit is connected to the control grid 51 of tube 50. The tube 50 receives its operating current and voltages by means of another source of D. C. potential, having a positive terminal 57 and a negative terminal 57' grounded at 53. In this particular case, the cathode of tube 50 is adjustably connected to the resistor 52. The control grid is grounded at point 53. Therefore, when the bridge is balanced, no current will flow in the plate circuit of tube 50 since the cathode is maintained at a higher positive potential than the control grid. If the tubes are arranged such that the tube 62 is in shadow and 61 is in light, the piece is good, and the bridge will become unbalanced and drive the potential of the control grid 51 in a positive direction and the tube 50 will conduct a current and the selecting or control means 56 will be actuated. Any suitable source of power 55 may be used. Thus it is shown that the indicating means is only actuated when the piece is good, although by reversing the normal bias of the control grid and the relationship of tubes 61 and 62, the indicating device could likewise be operated when the piece is bad.

Figure 14 is similar to Figure 13 except that it does not use a bridge but controls the control grid in exactly the same manner as the tubes do in Figure 13. In Figure 14, the control grid 51 is driven in a positive direction when tube 62 is in shadow and tube 61 is in light and indicator 56 is actuated. Figure 15 illustrates a method of controlling the potential of a control grid 51, similar to that shown in Figure 13, but in place of the tube 62 of Figure 14, the resistor 63 may be used.

It is to be understood that the above description and the modifications illustrated in the drawings are illustrative of the broad aspects of my invention and may be modified within the scope of the following claims:

I claim as my invention:

1. An apparatus for inspecting different portions of an article comprising means defining an inspection zone, means for projecting a beam of light through said inspection zone, means for positioning an article to be inspected in said inspection zone, mirror magnifying means having more than one plane of magnification for reflecting said light beam and a plurality of photoelectric devices positioned to receive light from the magnifying means and positioned in different planes of magnification in order to inspect different portions of the article being inspected, said photoelectric devices arranged with respect to the article support in the inspection zone and with respect to the magnification means so as to be placed in a predetermined condition of illumination when a standard article is in the inspection zone.

2. The apparatus of claim 1 wherein the magnifying means comprises a mirror of spherical shape.

SAMUEL C. HURLEY, Jr.